(12) United States Patent
Aldana

(10) Patent No.: US 11,197,252 B2
(45) Date of Patent: Dec. 7, 2021

(54) METHODS AND SYSTEMS FOR REPRESENTING ERRORS

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 692 days.

(21) Appl. No.: 15/188,823

(22) Filed: Jun. 21, 2016

(65) Prior Publication Data

US 2017/0094619 A1    Mar. 30, 2017

Related U.S. Application Data

(60) Provisional application No. 62/233,940, filed on Sep. 28, 2015.

(51) Int. Cl.
| | |
|---|---|
| *H04W 56/00* | (2009.01) |
| *G01S 13/76* | (2006.01) |
| *G01S 5/00* | (2006.01) |
| *G01S 5/02* | (2010.01) |

(52) U.S. Cl.
CPC ......... *H04W 56/001* (2013.01); *G01S 5/0009* (2013.01); *G01S 5/021* (2013.01); *G01S 13/765* (2013.01); *H04W 56/003* (2013.01)

(58) Field of Classification Search
CPC .................................................. G01S 5/0009
See application file for complete search history.

(56) References Cited

U.S. PATENT DOCUMENTS

| | | | |
|---|---|---|---|
| 6,175,911 B1 | 1/2001 | Oberman et al. | |
| 6,411,799 B1 | 6/2002 | Padovani | |
| 9,444,566 B1 * | 9/2016 | Mustiere | H04J 3/0667 |
| 9,800,897 B2 | 10/2017 | Hagemeier et al. | |

(Continued)

FOREIGN PATENT DOCUMENTS

| | | |
|---|---|---|
| CN | 102905367 A | 1/2013 |
| CN | 103036628 A | 4/2013 |
| WO | 2013138814 A1 | 9/2013 |

OTHER PUBLICATIONS

Aldana C., "Proposed Resolution for Revmc—CID 2164, 11-14-0168-07-000m-Proposed-Resolution-for-Revmc-cid-2164", IEEE Draft, 11-14-0168-87-088m-Proposed-Resolution-For-Revmc-Cid-2164, IEEE-Sa Mentor, Piscataway, NJ USA, vol. 802 .11m, No. 7, Mar. 20, 2014 (Mar. 20, 2014), pp. 1-20, XP068868854, [retrieved on Mar. 20, 2014] the whole document.

(Continued)

*Primary Examiner* — Kevin M Cunningham
(74) *Attorney, Agent, or Firm* — Campbell C. Chiang; Hunter Clark PLLC

(57) ABSTRACT

Disclosed are systems, devices and methods for transmission of messages between wireless transceiver devices including fields representing values such as, for example, a range between devices, time of transmission of a message or time of receipt of a previous message. In particular embodiments, message may also comprise fields to express a maximum error in values representing range, time of transmission of a message or time of receipt of a previous message.

21 Claims, 9 Drawing Sheets

(56) References Cited

U.S. PATENT DOCUMENTS

| | | | |
|---|---|---|---|
| 2003/0208366 A1 | 11/2003 | Goldberg | |
| 2007/0165754 A1 | 7/2007 | Kiukkonen et al. | |
| 2008/0071502 A1* | 3/2008 | Check | G06F 9/30003 |
| | | | 702/186 |
| 2010/0034139 A1 | 2/2010 | Love et al. | |
| 2010/0164771 A1 | 7/2010 | Mateman | |
| 2010/0260155 A1* | 10/2010 | Grilli | H04B 7/2668 |
| | | | 370/336 |
| 2011/0143683 A1 | 6/2011 | Sridhara et al. | |
| 2012/0009867 A1 | 1/2012 | Hwang et al. | |
| 2013/0301500 A1* | 11/2013 | Koc | H04W 4/90 |
| | | | 370/311 |
| 2013/0336131 A1 | 12/2013 | Zhang et al. | |
| 2014/0016653 A1 | 1/2014 | Oh et al. | |
| 2014/0038598 A1 | 2/2014 | Ren et al. | |
| 2014/0073352 A1* | 3/2014 | Aldana | G01S 5/10 |
| | | | 455/456.1 |
| 2014/0335885 A1 | 11/2014 | Steiner et al. | |
| 2016/0143008 A1 | 5/2016 | Lee et al. | |
| 2016/0366660 A1* | 12/2016 | Segev | H04W 56/0045 |
| 2018/0167899 A1 | 6/2018 | Aldana | |
| 2018/0310263 A1 | 10/2018 | Aldana et al. | |

OTHER PUBLICATIONS

International Search Report and Written Opinion—PCT/US2016/054038—ISA/EPO—dated Dec. 21, 2016.
IEEE P802.11 Wireless LANs High Resolution FTM, Jul. 13, 2015, Amichai Sanderovich & Carlos Aldana (Year: 2015).
Taiwan Search Report—TW105131404—TIPO—dated Dec. 30, 2019.
Huawei H: "OTDOA Enhancements for Indoor Positioning", 3GPP Draft, R1-151870, 3GPP TSG RAN WG1 Meeting #80bis, Belgrade, Serbia, Apr. 20-24, 2015, 3 Pages.

* cited by examiner

| Measurement Start Time | BSSID | Range | Max Range Error Exponent | Reserved |
|---|---|---|---|---|
| Octets: 4 | 6 | ~~2~~ 3 | ~~2~~ 1 | 1 |

FIG. 9

METHODS AND SYSTEMS FOR REPRESENTING ERRORS

This application claims the benefit of U.S. Provisional Application No. 62/233,940, entitled "Methods and Systems for Representing Errors," filed Sep. 28, 2015, which is assigned to the assignee thereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

SUMMARY

Briefly, one particular implementation is directed to a method, at a first wireless station (STA) comprising: transmitting a fine timing measurement (FTM) message comprising at least a time of departure (TOD) field and at least one other field, the at least one other field expressing a maximum TOD error in five bits or less, the at least one other field being capable of expressing the maximum TOD error as large as 1.0 msec.

Another particular implementation is directed to a first wireless station (STA), comprising: a wireless transceiver to transmit messages to and receive messages from a wireless communication network; and one or more processors coupled to the wireless transmitter, the one or more processors being configured to: initiate transmission of a fine timing measurement (FTM) message through the wireless transceiver comprising at least a time of departure (TOD) field and at least one other field, the at least one other field expressing a maximum TOD error in five bits or less, the at least one other field being capable of expressing the maximum TOD error as large as 1.0 msec.

Another particular implementation is directed to a first wireless station (STA), comprising: means for receiving a fine timing measurement (FTM) request message; and means for transmitting an FTM message in response to the FTM request message comprising at least a time of departure (TOD) field and at least one other field, the at least one other field expressing a maximum TOD error in five bits or less, the at least one other field being capable of expressing the maximum TOD error as large as 1.0 msec.

Another particular implementation is directed to a non-transitory storage medium having computer-readable instructions stored thereon which are executable by a process of a first wireless station (STA) to: initiate transmission of a fine timing measurement (FTM) message through a wireless transmitter comprising at least a time of departure (TOD) field and at least one other field, the at least one other field expressing a maximum TOD error in five bits or less, the at least one other field being capable of expressing the maximum TOD error as large as 1.0 msec.

One particular embodiment is directed to a method, at a first wireless station, comprising: transmitting a fine timing measurement (FTM) range report message comprising at least a range field and at least one other field, the at least one other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a non-transitory storage medium having computer-readable instructions stored thereon which are executable by a process of a first wireless station (STA) to: initiate transmission of a fine timing measurement (FTM) message through a wireless transmitter comprising at least a range field and at least one other field, the at least on other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a first wireless station (STA), comprising: a wireless transceiver to transmit messages to a wireless communication network; and one or more processors coupled to the wireless transmitter, the one or more processors being configured to: initiate transmission of a fine timing measurement (FTM) message through the wireless transmitter comprising at least a range field and at least one other field, the at least one other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a first wireless station, comprising: means for receiving one or more fine timing measurement (FTM) messages; and means for transmitting an FTM range report message based, at least in part, on the received one or more FTM messages, the FTM range report message comprising at least a range field and at least one other field, the at least one other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a first wireless station (STA), comprising: receiving a fine timing measurement (FTM) message comprising at least a time of departure (TOD) field and at least one other field, the at least one other field expressing a maximum TOD error in five bits or less; and decoding the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, method further comprising decoding the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

Another particular implementation is directed to a first wireless station (STA), comprising: a wireless transceiver to receive messages from a wireless communication network; and one or more processors configured to: obtain a fine timing measurement (FTM) message received at the wireless receiver comprising at least a time of departure (TOD) field and at least one other field, the at least one other field expressing a maximum TOD error in five bits or less; and decode the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, and wherein the one or more processors are further configured to decode the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

In another particular embodiment, a first wireless station (STA), comprising: means for receiving a fine timing measurement (FTM) message comprising at least a time of departure (TOD) field and at least one other field, the at least one other field expressing a maximum TOD error in five bits or less; and means for decoding the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, the first STA further comprising means for decoding the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

Another particular implementation is directed to a non-transitory storage medium having computer-readable instructions stored thereon which are executable by a processor of a first wireless station (STA) to: obtain a fine timing measurement (FTM) message received at a wireless transmitter comprising at least a time of departure (TOD) field and at least one other field, the at least one other field expressing a maximum TOD error in five bits or less; and decode the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, and wherein the instructions are further executable by the processor to decode the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

Another particular embodiment is directed to a method, at a first wireless station, comprising: receiving a fine timing measurement (FTM) range report message comprising at least a range field and at least one other field, the at least one other field being capable of expressing a maximum range error in five bits or less; and decoding the at least one other field to determine the maximum range error up to at least 2000 m.

In another particular embodiment is directed to a non-transitory storage medium having computer-readable instructions stored thereon which are executable by a process of a first wireless station (STA) to: obtain a fine timing measurement (FTM) message received at a wireless receiver comprising at least a range field and at least one other field, the at least one other field being capable of expressing a maximum range error in five bits or less; and decode the at least one other field to determine the maximum range error up to at least 2000 m.

Another particular embodiment is directed to a first wireless station (STA), comprising: a wireless receiver to receive messages from a wireless communication network; and one or more processors coupled to the wireless receiver, the one or more processors being configured to: obtain a fine timing measurement (FTM) message received at the wireless receiver comprising at least a range field and at least one other field, the at least one other field being capable of expressing a maximum range error in five bits or less; and decode the at least one other field to determine the maximum range error up to at least 2000 m.

Another particular embodiment is directed to a first wireless station, comprising: means for receiving a fine timing measurement (FTM) range report message comprising at least a range field and at least one other field, the at least one other field being capable of expressing a maximum range error in five bits or less; and means for decoding the at least one other field to determine the maximum range error up to at least 2000 m.

It should be understood that the aforementioned implementations are merely example implementations, and that claimed subject matter is not necessarily limited to any particular aspect of these example implementations.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 9 shows fields of an FTM range report message according to a particular embodiment.

DETAILED DESCRIPTION

As discussed below, particular message flows may enable effective and efficient measurements of a round trip time (RTT) or time of flight (TOF) in connection with a transmission of messages between wireless stations (STAs). In a particular example, a STA may comprise any one of several types of transceiver devices such as, for example, a mobile user station (e.g., smartphone, notebook computer, wireless audio speaker device, tablet computer, etc.) or wireless service access device (e.g., wireless local area network (WLAN) access point, personal area network (PAN) or femto cell). Particular message flows and fields in message frames may enable obtaining RTT of TOF measurements with sufficient accuracy for measuring a range between the wireless STAs, for example. Such a measured range may be used in any one of several applications including positioning operations, for example.

In some implementations, different STAs may maintain synchronized clock states to assist with coordinating actions between different STAs in particular applications. According to an embodiment, a first STA and second STA may exchange messages to, among other things, synchronize clock states maintained at the first and second STAs. The first STA may synchronize the clock state maintained at the first STA with the clock state maintained at the second STA based, at least in part, on precision values in messages received at the first STA indicating a time of transmission of the messages or times of receipt of previous messages. Synchronizing the first clock with the second clock, the first wireless transceiver device may enable coordinated operations between the first and second wireless transceiver devices to perform particular functions such as, for example, obtaining ranging measurements.

As discussed below, a first STA may transmit an FTM request message to a second STA to initiate a process for an exchange of messages or frames enabling the second STA to synchronize a state of a clock to a state of a clock maintained by another device. In this context, an "FTM request message" comprises a message comprising one or more fields to express values indicative of a time of transmission of the FTM message or a time of receipt of a previous message, or a combination thereof. In particular implementations as discussed below, the first and second STAs may synchronize respective clock states by exchanging messages to precision values indicating times of transmission of the messages and time of receipt of previous messages.

Figure 1:
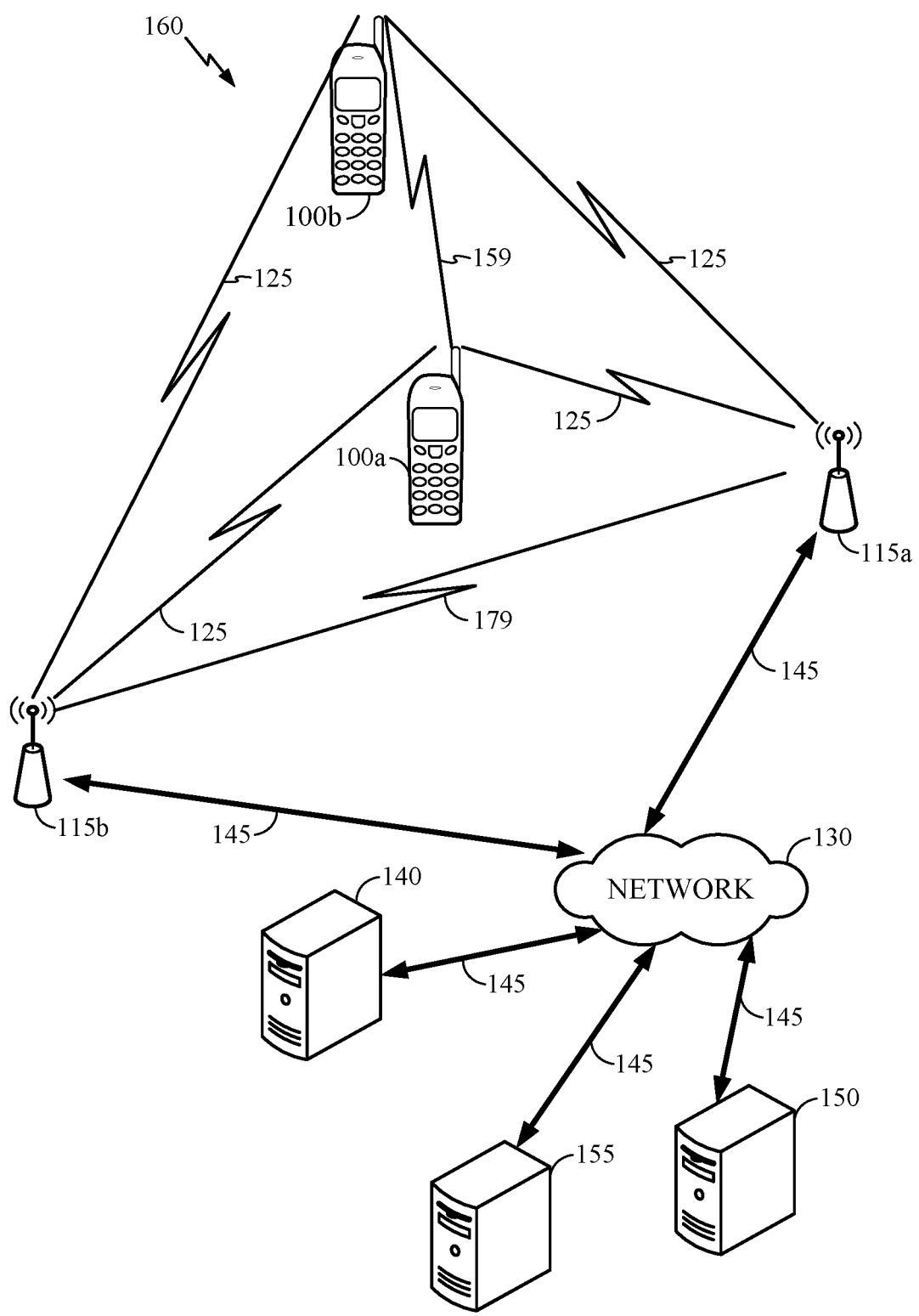
FIG. 1 is a system diagram illustrating certain features of a system containing a mobile device, in accordance with an implementation.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprising TOF, AoA, RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In a particular implementation, a mobile device 100 or local transceiver 115 may be capable of computing a position fix based, at least in part, on signals acquired from local transmitters (e.g., WLAN access points positioned at known locations). For example, a receiver device (e.g., a mobile device 100 or local transceiver 115) may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, a mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE P802.11-REVmc™/D4.2 Draft Standard 802.11 for Information technology—Telecommunications and information exchange between systems, Local and metropolitan area networks—Specific requirements Part 11: Wireless LAN Medium Access Control (MAC) and Physical Layer (PHY), September 2015, section 11.24.6 (hereinafter "IEEE P802.11-REVmc™/D5.3"). Indeed, it should be understood that some features described herein are not shown, described or taught in IEEE P802.11-REVmc™/D5.3.

Figure 2:
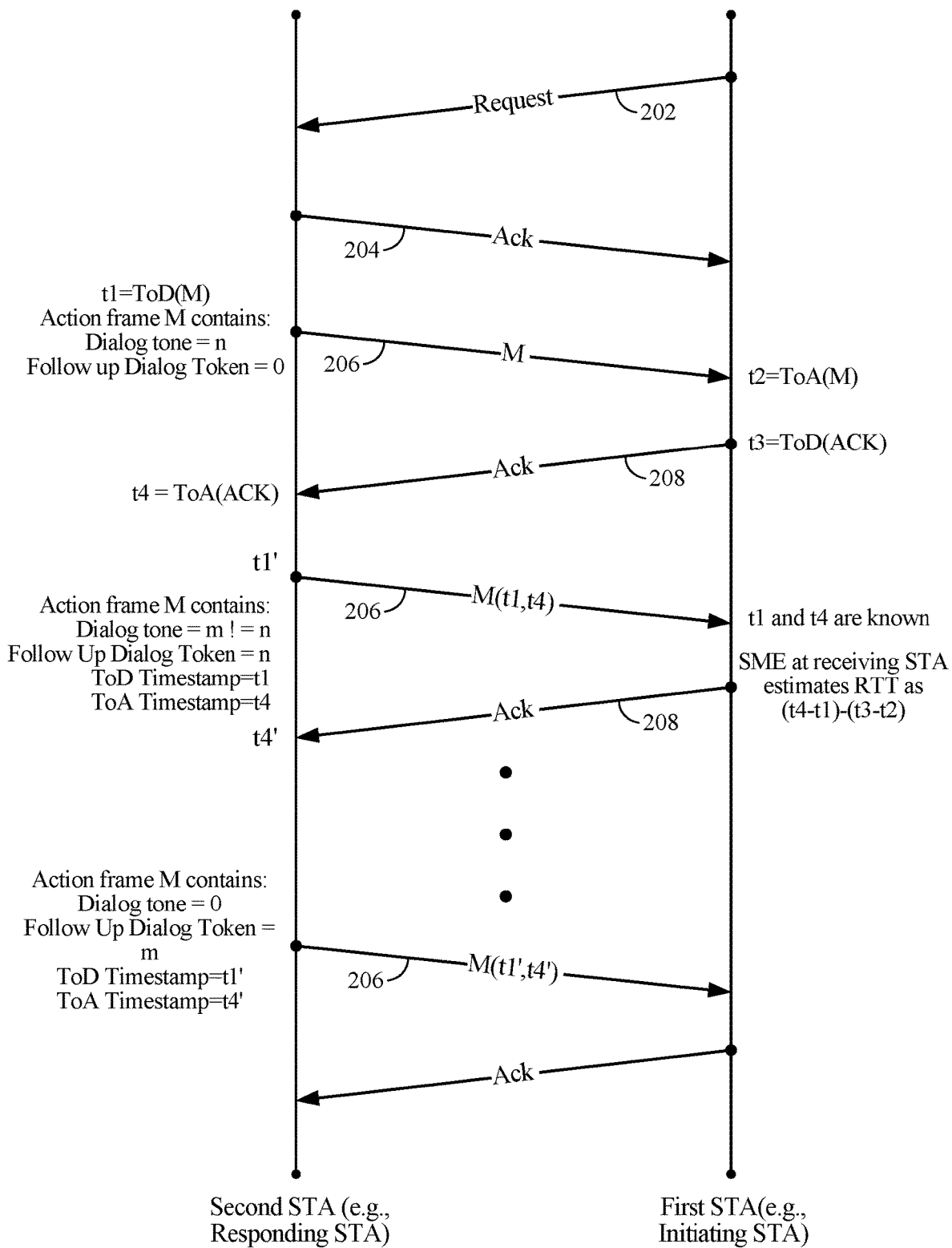
FIG. 2 is a diagram illustrating a message flow between wireless stations (STAs) according to particular embodiments.

FIG. 2 is a diagram illustrating a message flow between wireless stations (STAs) including a (first) "initiating" STA and a (second) "responding" STA according to an example embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a TM or FTM request message or frame ("Request") 202 to the responding STA and receive an acknowledgement message or frame ("Ack") 204 transmitted in response. In a particular implementation, while not limiting claimed subject matter in this respect, contents of such an FTM request message may be as shown in the IEEE P802.11-REVmc™/D5.3. In particular implementations, such an Ack frame 204 may provide an indication of receipt of a previously transmitted message. The initiating STA may then obtain or compute an RTT measurement based, at least in part, on time stamp values (t1, t4) provided in TM or FTM messages or frames ("M") 206 received from the responding STA (and transmitted in response to receipt of a fine timing measurement request message). In a particular implementation, as shown in the message flow diagram, a sequence of multiple exchanges of alternating TM or FTM messages 206 followed by acknowledgement messages 208 may create additional time stamp values (t1, t2, t3 and t4).

According to an embodiment, a TM or FTM request message transmitted by an initiating STA may include fields, parameters, etc. characterizing a desired exchange of messages with a responding STA to provide TM or FTM measurements to the initiating STA enabling the initiating STA to compute a measurement (e.g., TOF or RTT). In response to receipt of a TM or FTM request message, a responding STA may transmit to the initiating STA one or more TM messages or FTM messages including measurements or parameters enabling the initiating STA to compute RTT, TOF or other parameters indicative of range.

In a particular implementation, while not limiting claimed subject matter in this respect, contents of such an FTM message or frame may be as shown in the IEEE P802.11-REVmc™/D5.3. In one example implementation, an initiating STA may compute an RTT measurement as (t4−t1)−(t3−t2), where t2 and t3 are the time of receipt of a previous FTM message or frame and transmission of a preceding acknowledgement message or frame, respectively. Similarly, with exactly the same set of frames, the initiating STA can compute a clock offset as ½*((t2−t1)−(t4−t3)). The initiating STA may transmit a single FTM request message to obtain a corresponding number of RTT measurements which may be combined for cancellation of unbiased measurement noise in computing a range or offset between the receiving and responding STAs.

According to an embodiment, an FTM message (e.g., a message 206 transmitted as an FTM message) may include a time of arrival (TOA) field indicating a time of receipt of an FTM request message and a time of departure (TOD) field indicating a time that the FTM is being transmitted. The FTM message may express values in the TOA and TOD fields according to a clock maintained at a responding STA. Here, the responding STA may also determine a maximum error associated with values in the TOA and TOD fields, which may be expressed as an exponent, according to embodiments as discussed below.

As TOD and TOA values in FTM messages have transitioned from 100 ps to 1 ps level accuracy, bit widths of the timestamp Error fields (e.g., expressing maximum errors in TOA or TOD) were kept the same and the maximum error values were reduced from 3.2767 μs to 1.064896 μs. While these maximum values may be appropriate for ranging operations, this accuracy may not be sufficient for synchronization of clock states maintained at a responding STA and an initiating STA, where an error field can be as large as 1.0 ms.

Figure 3:
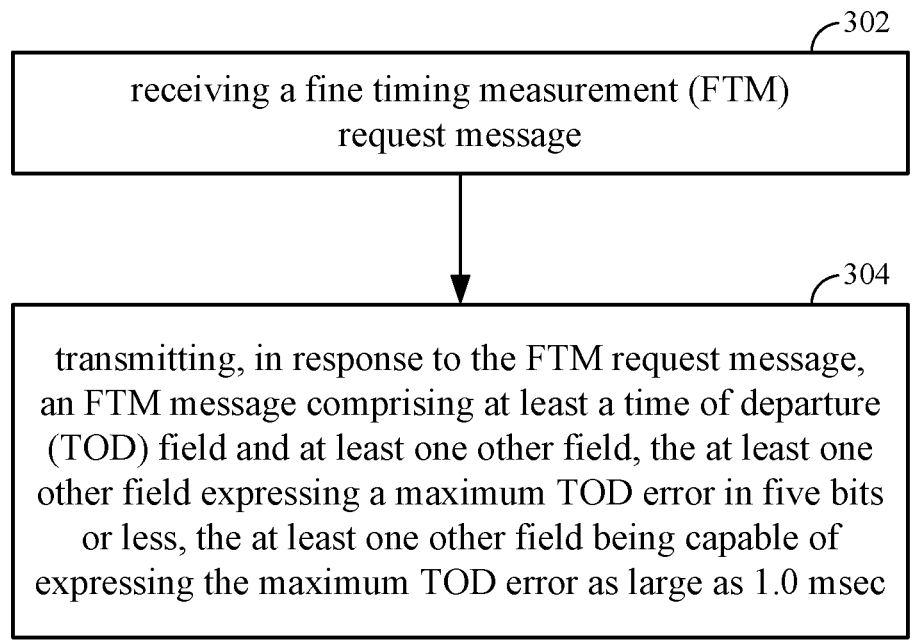
FIGS. 3 and 4 are flow diagrams of processes to exchange fine timing measurement (FTM) messages according to a particular embodiment.
Figure 4:
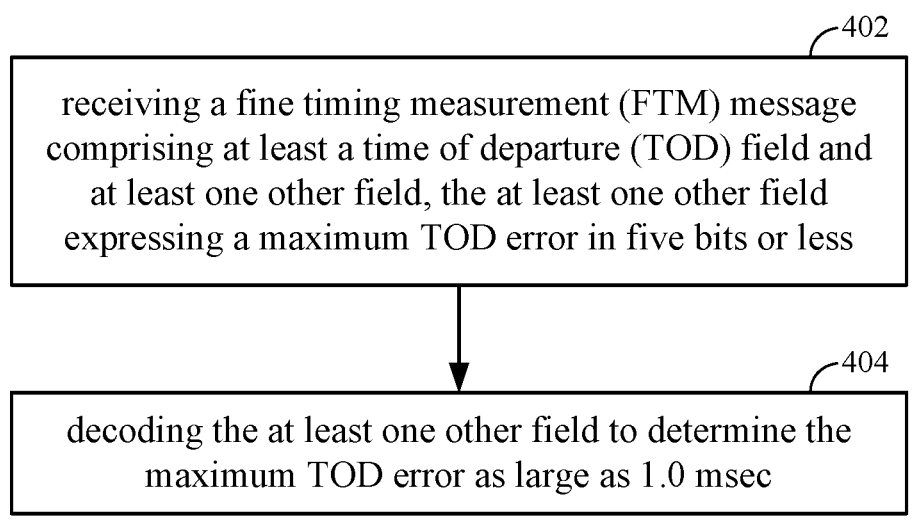
Figure 10:
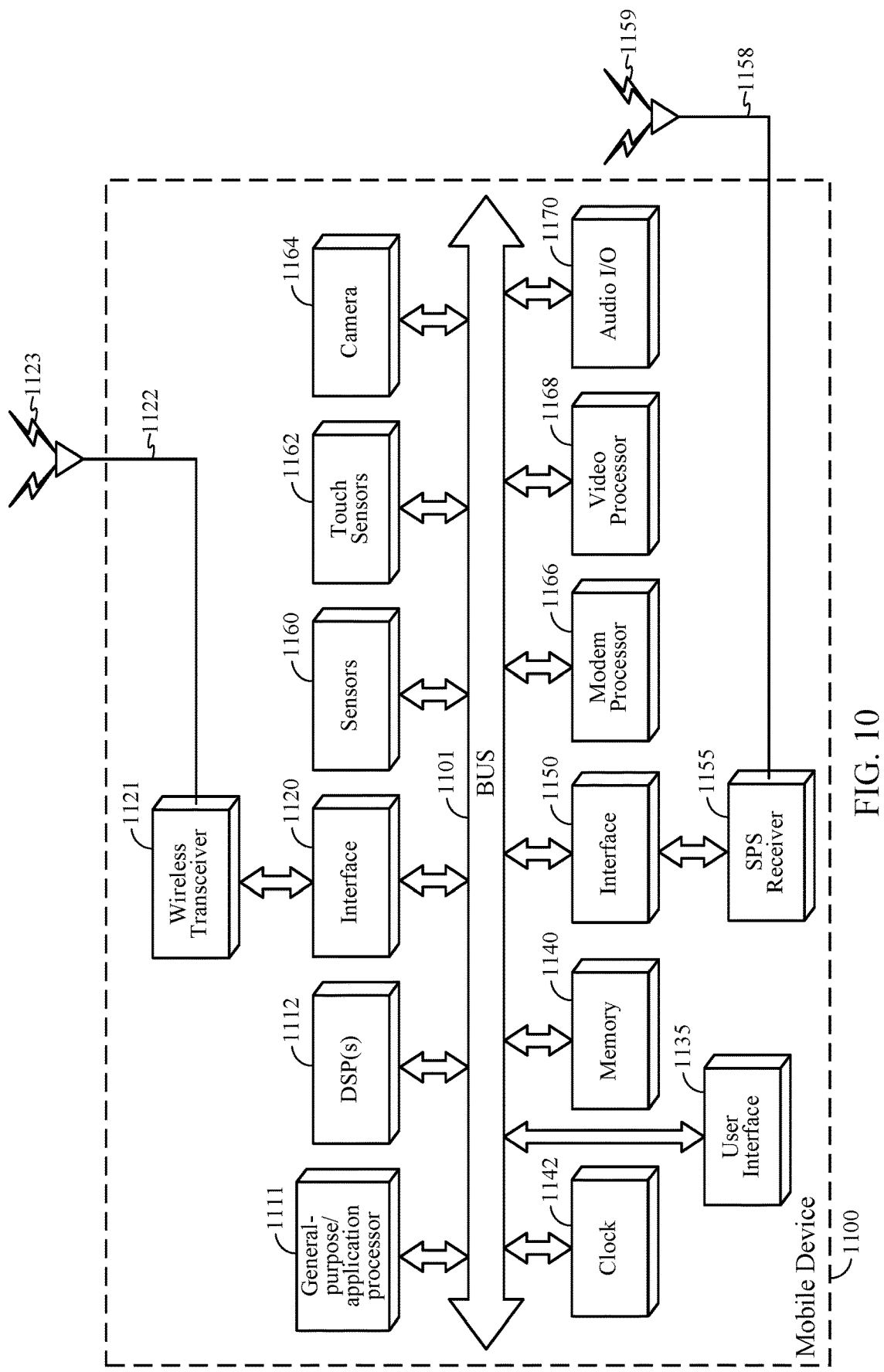
FIG. 10 is a schematic block diagram illustrating an exemplary device, in accordance with an implementation.
Figure 11:
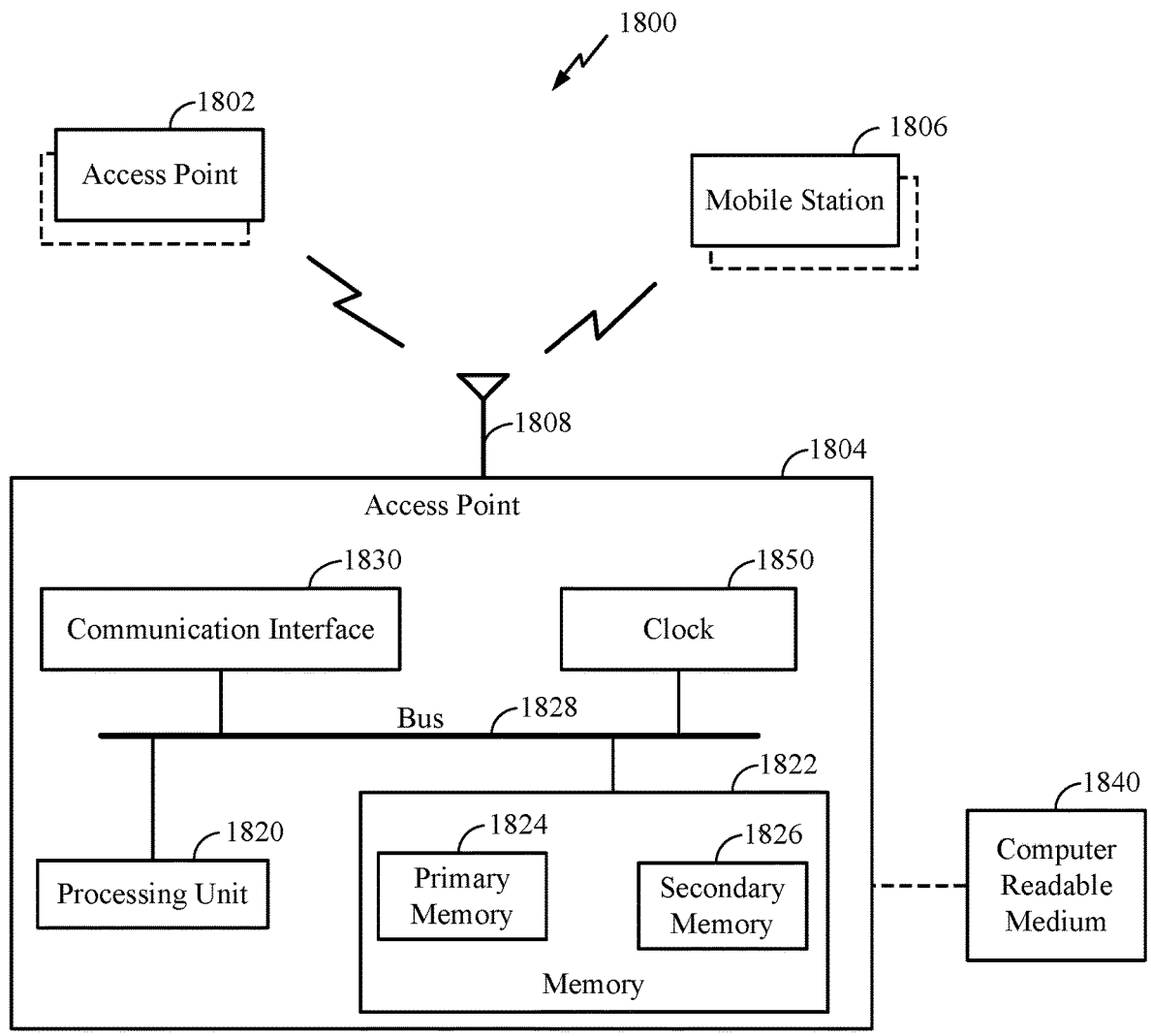
FIG. 11 is a schematic block diagram of an example computing system in accordance with an implementation.

According to an embodiment, the number of bits to express a maximum error in a TOA or TOD value may be reduced from fifteen bits to five bits. FIGS. 3 and 4 illustrate aspects of processes that may be performed at STAs for transmission and processing of an FTM message according to particular embodiments. At block 302, a responding STA may receive an FTM request message (e.g., FTM request message 202) transmitted by an initiating STA. In response to the FTM request message, at block 304 the responding STA may transmit an FTM message comprising a first field expressing a time of departure (e.g., TOD) of the FTM message and at least one other second field expressing a maximum error in a value expressed in the first field. The second field may express the maximum error in the value expressed first field as being as large as 1.0 msec and in five bits or less. In particular implementations, actions set forth at blocks 302 and 304 may be performed using any one of several structures such as, for example, wireless transceiver 1121 in combination with processing structures such as general purpose/application processor 1111, DSP(s) 1112 and/or modem processor 1166 (e.g., executing instructions stored in memory 1140) as shown in FIG. 10, or communication interface 1830 in combination with processing structures such as processing unit 1820 (e.g., executing instructions stored in memory 1822 as shown in FIG. 11. It should be understood, however, that these are merely examples of structures that may be used to execute actions shown in blocks 302 and 304, and claimed subject matter is not limited in this respect.

At block 402, an initiating STA may receive an FTM message from a responding STA. The FTM message received at block 402 may be an FTM message such as that transmitted at block 304 by having at least a first field expressing a time of departure of the FTM message and at least a second field expressing a maximum error in a value expressed in the first field in five bits or less. Block 404 may then decode the second field to determine the maximum error in the value expressed in the first field as being as large as 1.0 msec. In particular implementations, actions set forth at blocks 402 and 404 may be performed using any one of several structures such as, for example, wireless transceiver 1121 in combination with processing structures such as general purpose/application processor 1111, DSP(s) 1112 and/or modem processor 1166 (e.g., executing instructions stored in memory 1140) as shown in FIG. 10, or communication interface 1830 in combination with processing structures such as processing unit 1820 (e.g., executing instructions stored in memory 1822 as shown in FIG. 11. It should be understood, however, that these are merely examples of structures that may be used to execute actions shown in blocks 402 and 404, and claimed subject matter is not limited in this respect.

According to an embodiment, a five-bit field in a FTM measurement message (e.g., an FTM message transmitted at block or received at block 402) may have any one of thirty-two possible states having binary representations from "00000" (representing a binary value of zero) to "11111" (representing a binary value of thirty-one). These different possible states may be mapped to a particular maximum error of a TOA or TOD value (e.g., expressed in a different field in the same FTM message) according to expression (1) as follows:

$$E_{max} = \begin{cases} \text{unknown}, & \text{Max Error} = 0 \\ 2^{(Max\ Error-1)}, & \text{Max Error} = 1{:}30 \\ \geq 2^{30}, & \text{Max Error} = 31 \end{cases} \quad (1)$$

Figure 5:
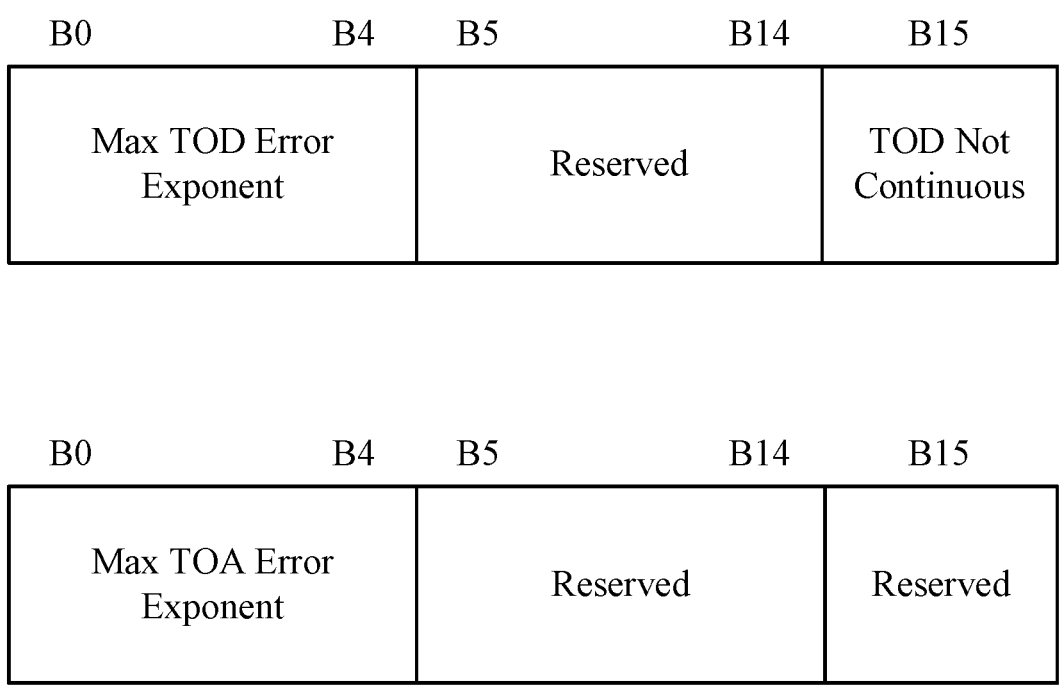
FIG. 5 shows fields of a fine timing measurement (FTM) request message according to a particular embodiment.

In an embodiment, a STA receiving an FTM message with a "Max Error" in a five-bit field expressing an error in a TOA or TOD value may decode "Max Error" according to expression (1) (e.g., at block 404) to determine the maximum error $E_{max}$. Here, a value of Max Error=00000 in an error field indicates that a maximum error is unknown while a value of Max Error=11111 in an error field indicates that a maximum error is greater than $2^{30}$ or 1073741824 psec. A value of Max Error=00001 (representing a binary value of one) to 11110 (representing a binary value of 31) indicates a maximum error of $2^{(Max\ Error-1)}$ psec. Expression (1) may express a maximum error in TOA or TOD as small as 1.0 ps and as large as 1.0 msec with only five bits. This is shown in a particular example of an FTM message shown in FIG. 5 at field Max TOD Error Exponent and field Max TOA Error Exponent, each made up of five bits to express a value for $E_{max}$ as an exponent according to expression (1).

Figure 6:
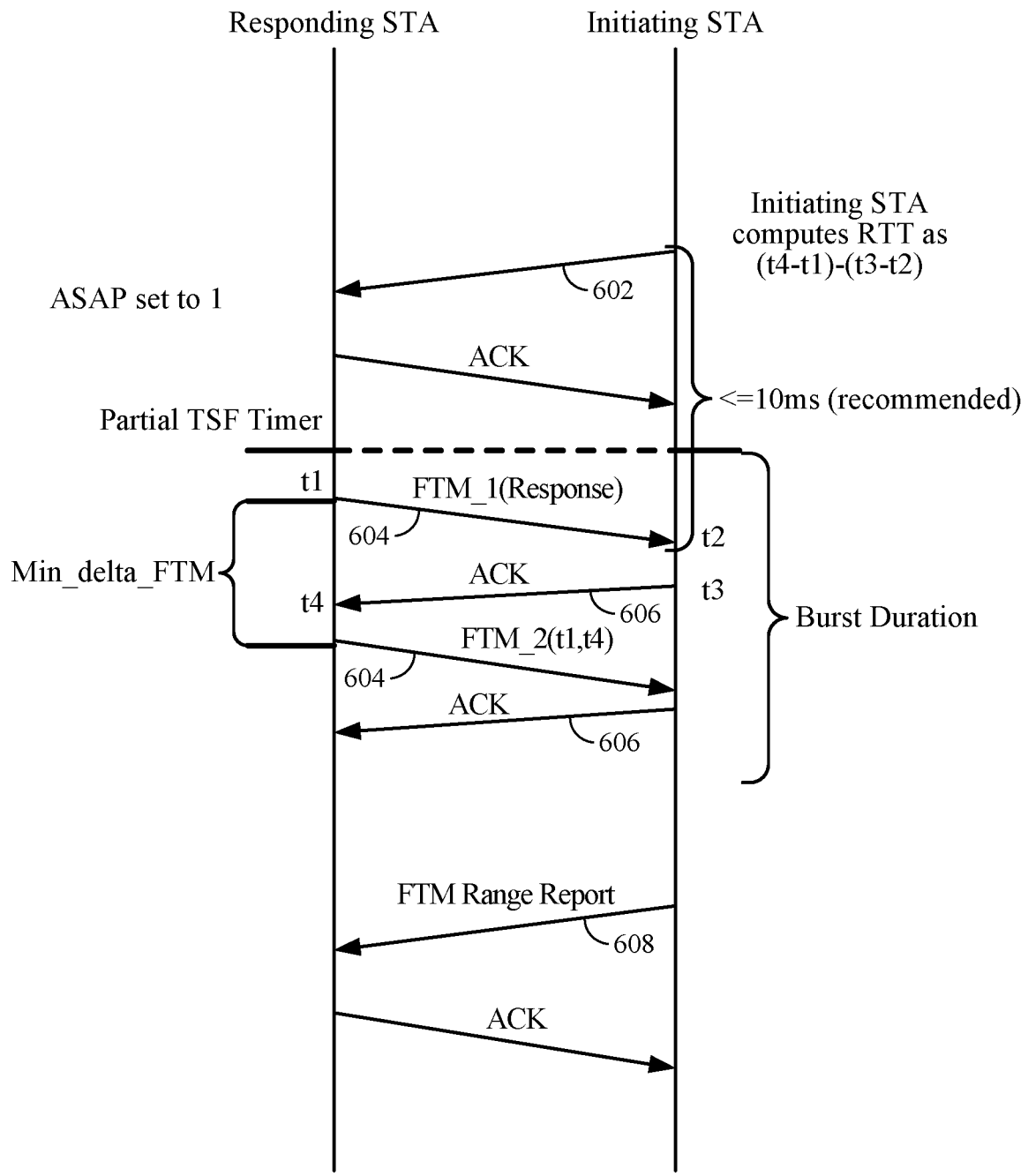
FIG. 6 is a flow diagram illustrating a message flow between wireless stations (STAs) according to particular embodiments.

According to an embodiment, an RTT measurement computed at an initiating STA may be used for obtaining an estimated location of the initiating STA using techniques described above such as trilateration. In other implementations, an RTT measurement computed (and/or range computed based on one or more RTT measurements) at an initiating STA may be shared with a responding STA (participating in obtaining fine timing measurements used in computing RTT). In one embodiment, a fine timing measurement request message may comprise many fields including a "trigger" field in which an initiating STA may characterize a transaction between the initiating STA and a responding STA in obtaining a fine timing measurement. In a particular implementation, an initiating STA may specify a particular value in a trigger field of a fine timing measurement request message (e.g., two) indicating that the initiating STA is able and willing to share one or more computed RTT measurement (and/or range computed from RTT measurements) with a recipient responding STA. This is illustrated in the signal flow of FIG. 6. As shown, an initiating STA transmits a fine timing measurement request message 602 specifying a value of two in a trigger field. In a subsequent exchange of timing measurement messages 604 and ACK messages 606, the initiating STA may compute an RTT value as discussed above. Following an ACK message 606 transmitted by the initiating STA in response to receiving a final fine timing measurement message 604 (e.g., transporting values for t1 and t4), the initiating STA may transmit an FTM range report message 608 containing a value for RTT (and/or range) computed based, at least in part, on fine timing measurements received from the responding STA. In this context, an "FTM range report message" comprises a message including one or more fields expressing an indication of a range between two devices computed based, at least in part, on a message transmitted between the two devices.

Figure 7:
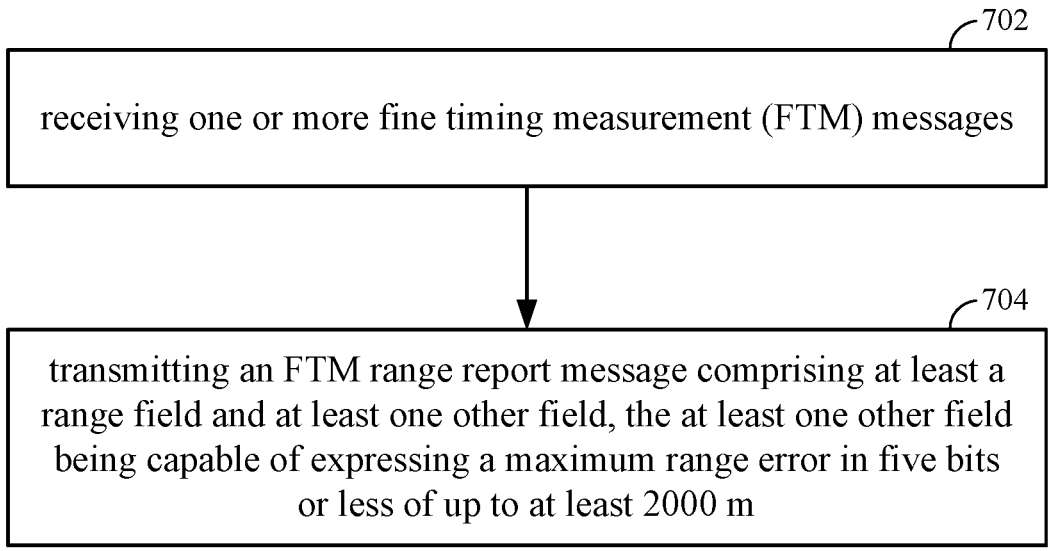
FIGS. 7 and 8 are flow diagrams of processes to exchange FTM range report messages according to a particular embodiment.
Figure 8:
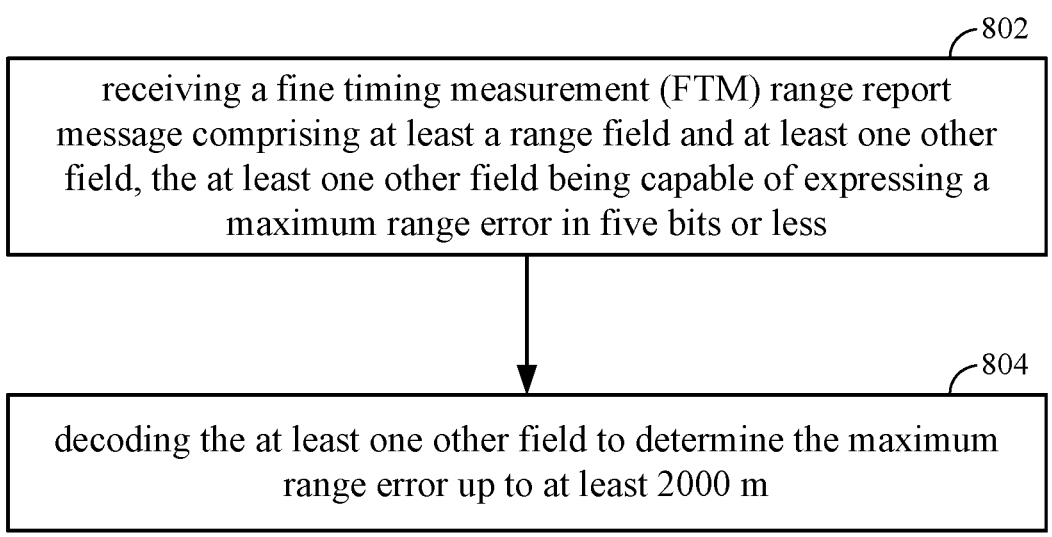

According to an embodiment, an FTM range report message transmitted from a first STA may include measurements of range between the first STA and one or more neighboring second STAs. For each of the second STAs, the FTM range report message may comprise a field identifying the second STA (e.g., BSSID), a field providing a range value and a field expressing a maximum range error. FIGS. 7 and 8 illustrated processes for providing an FTM range report message and processing an FTM range report message. At block 702, an initiating STA may receive one or more FTM messages (e.g., FTM messages 604 transmitted from a responding STA). At block 704, the initiating STA may transmit an FTM range report message (e.g., FTM range report message 608) comprising at least a first field comprising a range field and at least one second field. The range field may comprise one or more values indicative of a range from the initiating STA to a device transmitting the one or more FTM messages computed using any one of several technique discussed above. In particular implementations, actions set forth at blocks 702 and 704 may be performed using any one of several structures such as, for example, wireless transceiver 1121 in combination with processing structures such as general purpose/application processor 1111, DSP(s) 1112 and/or modem processor 1166 (e.g., executing instructions stored in memory 1140) as shown in FIG. 10, or communication interface 1830 in combination with processing structures such as processing unit 1820 (e.g., executing instructions stored in memory 1822 as shown in FIG. 11. It should be understood, however, that these are merely examples of structures that may be used to execute actions shown in blocks 702 and 704, and claimed subject matter is not limited in this respect.

FIG. 9 shows an example of fields in an FTM range report message transmitted at block 704 that include a range field labeled "Range." In addition, the second field comprises one or more values indicative of a maximum range error in the one or more values indicative of the range in the range field. FIG. 9 shows an example of field comprising one or more values indicative of a maximum range error labeled "Max Range Error Exponent." According to an embodiment, this maximum range error may be expressed in five bits or less and express a maximum range error of up to at least 2000 m.

In the particular implementation of FIG. 9, the field "Max Range Error Exponent" expressing a maximum range error may comprise an exponent value according to a the following providing obtained from according to expression (2) as follows:

$$\text{Range Error}_{max} = \begin{cases} \text{unknown, Max Range Error Exponent} = 0 \\ 2^{(\text{Max Range Error Exponent}-13)} \text{ m,} \\ \text{Max Range Error Exponent} = 1{:}24 \\ \geq 4096 \text{ m, Max Range Error Exponent} = 25 \end{cases} \quad (2)$$

As shown in FIG. 9, value for Max Range Error Exponent may be expressed in a single octet of an FTM range report message. According to an embodiment, the five least significant bits of a single octet allocated for the Max Range Error Exponent field may be used to express values from zero (expressed as "00000" in binary) to twenty-five (expressed as "11001" in binary). According to expression (2) value of fourteen in the a five-bit field for Max Range Error Exponent field ("01110") indicates a maximum range error as +1-2.0 m.

In the process of FIG. 8, a responding STA may receive an FTM range report message (e.g., FTM range report message 608) at block 802. The FTM range report message received at block 802 may comprises fields as shown in the example of FIG. 9, and may comprise a range field and at least one other field capable of expressing a maximum range error in five bits or less. At block 804, the responding STA may decode the field capable of expressing a maximum range field in five bits or less to determine a maximum range error of up to at least 2000 m. For example, block 804 may comprise decoding a five-bit value in the field "Max Range Error Exponent" shown in FIG. 9 to determine a maximum range error Range Error$_{max}$ according to expression (2). In particular implementations, actions set forth at blocks 802 and 804 may be performed using any one of several structures such as, for example, wireless transceiver 1121 in combination with processing structures such as general purpose/application processor 1111, DSP(s) 1112 and/or modem processor 1166 (e.g., executing instructions stored in memory 1140) as shown in FIG. 10, or communication interface 1830 in combination with processing structures such as processing unit 1820 (e.g., executing instructions stored in memory 1822 as shown in FIG. 11. It should be understood, however, that these are merely examples of structures that may be used to execute actions shown in blocks 802 and 804, and claimed subject matter is not limited in this respect.

FIG. 10 is a schematic diagram of a mobile device according to an embodiment. Mobile device 100 (FIG. 1) may comprise one or more features of mobile device 1100 shown in FIG. 10. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCD-MA, LTE, UMTS, GSM, AMPS, Zigbee and Bluetooth, just to name a few examples.

Mobile device 1100 may further comprise a clock 1142 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 1142 may comprise registers, oscillators, input terminals output terminals, etc. capable of providing values indicative of a clock state. In particular embodiments, a clock state maintained at clock 1142 may be used to control processes to execute application functions on in a coordinated fashion on general purpose/application processor 1111, DSP(s) 1112, etc. As pointed out above, a clock state maintained at clock 1142 may be synchronized with clock states maintained by devices other than mobile device 1100.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 10, mobile device 1100 may comprise digital signal processor(s) (DSP(s)) 1112 connected to the bus 1101 by a bus interface, general-purpose processor(s) 1111 connected to the bus 1101 by a bus interface 1110 and memory 1140. In a particular implementation, the bus interface may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 3, 4, 7 and 8.

Also shown in FIG. 4, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyro-scopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be up-converted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 11 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 11, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 11, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1800.

It is recognized that all or part of the various devices and networks shown in FIG. 11, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 3, 4, 7 and 8.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may further comprise a clock 1850 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 1850 may comprise registers, oscillators, input terminals output terminals, etc. capable of providing values indicative of a clock state. In particular embodiments, a clock state maintained at clock 1850 may be used to control processes to execute application functions on in a coordinated fashion on general purpose/application processor 1111, DSP(s) 1112, etc. As pointed out above, a clock state maintained at clock 1850 may be synchronized with clock states maintained by devices other than second device 1804 (e.g., first device 1802 and third device 1806).

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 3, 4, 7 and 8.

In one particular implementation, transmission of an ACK message in response to a FTM measurement request message may be performed at communication interface 1830 without instruction or initiation from processing unit 1820. On the other hand, an FTM range report message may be formed at a programmable device such as processing unit 1820 (e.g., from execution of one or more machine-readable instructions stored in memory 1822).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, track-ball, touch screen, data port, etc.

One particular embodiment is directed to a method, at a first wireless station, comprising: transmitting a fine timing measurement (FTM) range report message comprising at least a range field and at least one other field, the at least one other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a non-transitory storage medium having computer-readable instructions stored thereon which are executable by a process of a first wireless station (STA) to: initiate transmission of a fine timing measurement (FTM) message through a wireless transmitter comprising at least a range field and at least one other field, the at least on other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a first wireless station (STA), comprising: a wireless transceiver to transmit messages to a wireless communication network; and one or more processors coupled to the wireless transmitter, the one or more processors being configured to: initiate transmission of a fine timing measurement (FTM) message through the wireless transmitter comprising at least a range field and at least one other field, the at least one other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a first wireless station, comprising: means for receiving one or more fine timing measurement (FTM) messages; and means for transmitting an FTM range report message based, at least in part, on the received one or more FTM messages, the FTM range report message comprising at least a range field and at least one other field, the at least one other field being capable of expressing a maximum range error in five bits or less of up to at least 2000 m. In one particular implementation, the at least one other field expresses the maximum range error as an exponent. In another particular implementation, the at least one other field is further capable of expressing the maximum range error at least as small as 0.00025 m.

Another particular embodiment is directed to a first wireless station (STA), comprising: receiving a fine timing measurement (FTM) message comprising at least a time of departure (TOD) field and at least one other field, the at least one other field expressing a maximum TOD error in five bits or less; and decoding the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, method further comprising decoding the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

Another particular implementation is directed to a first wireless station (STA), comprising: a wireless transceiver to receive messages from a wireless communication network; and one or more processors configured to: obtain a fine timing measurement (FTM) message received at the wireless receiver comprising at least a time of departure (TOD) field and at least one other field, the at least one other field expressing a maximum TOD error in five bits or less; and decode the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, and wherein the one or more processors are further configured to decode the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

In another particular embodiment, a first wireless station (STA), comprising: means for receiving a fine timing measurement (FTM) message comprising at least a time of departure (TOD) field and at least one other field, the at least one other field expressing a maximum TOD error in five bits or less; and means for decoding the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, the first STA further comprising means for decoding the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

Another particular implementation is directed to a non-transitory storage medium having computer-readable instructions stored thereon which are executable by a processor of a first wireless station (STA) to: obtain a fine timing measurement (FTM) message received at a wireless transmitter comprising at least a time of departure (TOD) field and at least one other field, the at least one other field expressing a maximum TOD error in five bits or less; and decode the at least one other field to determine the maximum TOD error as large as 1.0 msec. In one particular implementation, the FTM message is transmitted by a second STA in response to receipt of a FTM request message transmitted by the first STA. In another particular implementation, the at least one other field expresses the maximum TOD error as an exponent. In another particular implementation, the FTM message further comprises a time of arrival (TOA) field and at least one other field expressing a maximum TOA error in five bits or less, and wherein the instructions are further executable by the processor to decode the at least one other field to determine the maximum TOA error as large as 1.0 msec. In another particular implementation, the at least one other field being capable of expressing the maximum TOA error as small as 1.0 psec. In another particular implementation, the at least one other field is further capable of expressing the maximum TOD error as small as 1.0 psec.

Another particular embodiment is directed to a method, at a first wireless station, comprising: receiving a fine timing measurement (FTM) range report message comprising at least a range field and at least one other field, the at least one other field being capable of expressing a maximum range error in five bits or less; and decoding the at least one other field to determine the maximum range error up to at least 2000 m. In a particular implementation, the at least one other field expresses the maximum range error as an exponent. In a particular implementation, the at least one other field is further capable of expressing the maximum range error at least as small as 0.00025 m.

In another particular embodiment is directed to a non-transitory storage medium having computer-readable instructions stored thereon which are executable by a process of a first wireless station (STA) to: obtain a fine timing measurement (FTM) message received at a wireless receiver comprising at least a range field and at least one other field, the at least one other field being capable of expressing a maximum range error in five bits or less; and decode the at least one other field to determine the maximum range error up to at least 2000 m. In one particular implementation, the at least one other field expresses the maximum range error as an exponent. In another particular implementation, the instructions are further executable to decode the at least one other field to determine the maximum range error at least as small as 0.00025 m.

Another particular embodiment is directed to a first wireless station (STA), comprising: a wireless receiver to receive messages from a wireless communication network; and one or more processors coupled to the wireless receiver, the one or more processors being configured to: obtain a fine timing measurement (FTM) message received at the wireless receiver comprising at least a range field and at least one other field, the at least one other field being capable of expressing a maximum range error in five bits or less; and decode the at least one other field to determine the maximum range error up to at least 2000 m. In one particular implementation, the at least one other field expresses the maximum range error as an exponent. In another particular implementation, the instructions are further executable by the processor to decode the at least one other field to determine the maximum range error at least as small as 0.00025 m.

Another particular embodiment is directed to a first wireless station, comprising: means for receiving a fine timing measurement (FTM) range report message comprising at least a range field and at least one other field, the at least one other field being capable of expressing a maximum range error in five bits or less; and means for decoding the at least one other field to determine the maximum range error up to at least 2000 m. In one particular implementation, the at least one other field expresses the maximum range error as an exponent. In another particular implementation, the at least one other field is further capable of expressing the maximum range error at least as small as 0.00025 m.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100*a*, 100*b*, 115*a* and 115*b*. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a first wireless station (STA), comprising:
   determining, at the first STA, a maximum time of departure (TOD) error as an exponent in five bits or less, wherein the maximum TOD error is capable of expressing the maximum TOD error as large as 1.073741824 msec;
   transmitting to a second STA, via a wireless transceiver, a fine timing measurement (FTM) message comprising at least a TOD field and at least one other field, the at least one other field expressing the maximum TOD error in five bits or less; and
   synchronizing a first clock state of the first STA with a second clock state of the second STA based at least in part on the maximum TOD error and TOD information regarding a TOD of a message at the first STA.

2. The method of claim 1, wherein the FTM message is transmitted in response to receipt of a FTM request message transmitted by a second STA.

3. The method of claim 1, wherein the FTM message further comprises a time of arrival (TOA) field and at least one other field expressing a maximum TOA error in five bits or less, the at least one other field being capable of expressing the maximum TOA error as large as 1.073741824 msec.

4. The method of claim 3, wherein the at least one other field being capable of expressing the maximum TOA error as small as 1.0 psec.

5. The method of claim 1, wherein the at least one other field is further capable of expressing the maximum TOD error as small as 1.0 psec.

6. The method of claim 1, wherein synchronizing the first clock state of the first STA with the second clock state of the second STA based at least in part on the maximum TOD error and the TOD information comprises determining a clock offset based on timing information included in a plurality of FTM messages.

7. A first wireless station (STA), comprising:
   a wireless transceiver to transmit messages to and receive messages from a wireless communication network; and
   one or more processors coupled to the wireless transmitter, the one or more processors being configured to:
      determine a maximum time of departure (TOD) error as an exponent in five bits or less, wherein the maximum TOD error is capable of expressing the maximum TOD error as large as 1.073741824 msec;
      initiate transmission of a fine timing measurement (FTM) message to a second STA through the wireless transceiver comprising at least a TOD field and at least one other field, the at least one other field expressing the maximum TOD error; and
      synchronize a first clock state of the first STA with a second clock state of the second STA based at least in part on the maximum TOD error and TOD information regarding a TOD of a message at the first STA.

8. The first STA of claim 7, wherein the FTM message is transmitted in response to receipt of a FTM request message transmitted by a second STA.

9. The first STA of claim 7, wherein the FTM message further comprises a time of arrival (TOA) field and at least one other field expressing a maximum TOA error in five bits or less, the at least one other field being capable of expressing the maximum TOA error as large as 1.073741824 msec.

10. The first STA of claim 9, wherein the at least one other field being capable of expressing the maximum TOA error as small as 1.0 psec.

11. The first STA of claim 7, wherein the at least one other field is further capable of expressing the maximum TOD error as small as 1.0 psec.

12. A first wireless station (STA), comprising:
   means for receiving a fine timing measurement (FTM) request message;
   means for determining a maximum time of departure (TOD) error as an exponent in five bits or less, wherein the maximum TOD error is capable of expressing the maximum TOD error as large as 1.073741824 msec;
   means for transmitting an FTM message to a second STA in response to the FTM request message comprising at least a TOD field and at least one other field, the at least one other field expressing the maximum TOD error; and
   means for synchronizing a first clock state of the first STA with a second clock state of the second STA based at least in part on the maximum TOD error and TOD information regarding a TOD of a message at the first STA.

13. The first STA of claim 12, wherein the FTM message is transmitted in response to receipt of a FTM request message transmitted by a second STA.

14. The first STA of claim 12, wherein the FTM message further comprises a time of arrival (TOA) field and at least one other field expressing a maximum TOA error in five bits or less, the at least one other field being capable of expressing the maximum TOA error as large as 1.073741824 msec.

15. The first STA of claim 14, wherein the at least one other field being capable of expressing the maximum TOA error as small as 1.0 psec.

16. The first STA of claim 12, wherein the at least one other field is further capable of expressing the maximum TOD error as small as 1.0 psec.

17. A non-transitory storage medium having computer-readable instructions stored thereon which are executable by a processor of a first wireless station (STA) to:
   determine a maximum time of departure (TOD) error as an exponent in five bits or less, wherein the maximum TOD error is capable of expressing the maximum TOD error as large as 1.073741824 msec; and
   initiate transmission of a fine timing measurement (FTM) message to a second STA through a wireless transmitter comprising at least a TOD field and at least one other field, the at least one other field expressing the maximum TOD error; and
   synchronize a first clock state of the first STA with a second clock state of the second STA based at least in part on the maximum TOD error and TOD information regarding a TOD of a message at the first STA.

18. The non-transitory storage medium of claim 17, wherein the FTM message is transmitted in response to receipt of a FTM request message transmitted by a second STA.

19. The non-transitory storage medium of claim 17, wherein the FTM message further comprises a time of arrival (TOA) field and at least one other field expressing a maximum TOA error in five bits or less, the at least one other field being capable of expressing the maximum TOA error as large as 1.073741824 msec.

20. The non-transitory storage medium of claim 19, wherein the at least one other field being capable of expressing the maximum TOA error as small as 1.0 psec.

21. The non-transitory storage medium of claim 17, wherein the at least one other field is further capable of expressing the maximum TOD error as small as 1.0 psec.

* * * * *